United States Patent [19]

Araseki et al.

[11] Patent Number: 4,670,903
[45] Date of Patent: Jun. 2, 1987

[54] ECHO CANCELLER FOR ATTENUATING ACOUSTIC ECHO SIGNALS ON A FREQUENCY DIVISIONAL MANNER

[75] Inventors: Takashi Araseki; Kazuo Ochiai, both of Tokyo, Japan

[73] Assignee: Nippon Electric Co., Ltd., Tokyo, Japan

[21] Appl. No.: 393,893

[22] Filed: Jun. 30, 1982

[30] Foreign Application Priority Data

Jun. 30, 1981 [JP] Japan ................................ 56-101938

[51] Int. Cl.$^4$ ............................................. H04B 3/20
[52] U.S. Cl. ..................................... 379/411; 379/410
[58] Field of Search ................ 179/170.2, 81 A, 81 B, 179/81 BC; 381/71, 93, 94, 95

[56] References Cited

U.S. PATENT DOCUMENTS 3,754,105  8/1973  Poschereider et al. .......... 179/170.2
3,784,747  1/1974  Berkley et al. .................... 179/81 B
4,225,754  9/1980  Bernard et al. ................... 179/81 B
4,362,909  12/1983 Snijders et al. .................. 179/170.2

Primary Examiner—Gene Z. Rubinson
Assistant Examiner—R. Vaas
Attorney, Agent, or Firm—Sughrue, Mion, Zinn, Macpeak, and Seas

[57] ABSTRACT

For use in combination with a loudspeaker and at least one microphone, for example, by attendants in an auditorium, an echo cancelling circuit comprises a self-adaptive echo canceller responsive to a lower frequency component, such as below 1.7 kHz, of a receive-in signal for self-adatively cancelling a corresponding component of a reverberation signal included in a send-in signal during each interval during which an audio signal reaches the circuit from a remote party. For a higher frequency reverberation signal component, an echo suppressor or a voice switch may reduce a weaker one of two signals which are either the higher frequency send-in and receive-in signal components or a combination of a reverberation component cancelled signal with the higher frequency send-in signal component and the whole receive-in signal. Alternatively, a less expensive echo canceller non-adaptively cancels a part of the reverberation signal in response to the receive-in signal. The lower frequency component of the partially reverberation cancelled signal is used by the self-adaptive echo canceller as the lower frequency send-in signal component. An acoustic output may once be reproduced by the loudspeaker in response to the receive-in signal and then converted to an electric signal for supply to the echo cancelling circuit.

29 Claims, 6 Drawing Figures ures 4,670,903

ECHO CANCELLER FOR ATTENUATING ACOUSTIC ECHO SIGNALS ON A FREQUENCY DIVISIONAL MANNER

BACKGROUND OF THE INVENTION

This invention relates to an echo cancelling circuit for use in a long-distance telephone network and, in particular, in a long-distance conference communication system.

Recently, a long-distance conference communication teleconference system has been developed which is suitable for a conference concurrently held at distant locations, namely, auditoria geographically spaced from one another. Such a system is very effective for saving money, time, and labor of participants attending the conference.

In general, an echo canceller circuit is coupled to a telephone transmitter, a telephone receiver, a sending path, and a receiving path. The circuit receives a send-in signal from the transmitter and sends a send-out signal to a remote party through the sending path. The circuit furthermore receives a receive-in signal from the remote party through the receiving path. The receive-in signal is supplied to the receiver for reproduction of the voice of the remote party. The signal supplied to the receiver will be called a receive-out signal. The circuit is for preventing a part of the receive-in signal from being sent back to the remote party as an echo signal in the send-out signal.

When such an echo cancelling circuit is used in a long-distance conference system, a microphone is used in place of the telephone transmitter. A loudspeaker is used in lieu of the telephone receiver so that the attendants in a particular auditorium can listen to the speech of a speaker in a remote auditorium.

With this system, it should be considered that the loudspeaker is unfavorably acoustically coupled to the microphone. Even a disagreeable howling takes place when the loudspeaker is acoustically closely coupled to the microphone. Such a howling is comparatively readily avoided in a known manner.

In addition to avoiding the howling, it is required in the system to weaken acoustic coupling between the loudspeaker and the microphone. This is because an increasing number of the loudspeakers and the microphones are arranged in the system with an increase of the auditoria and, as a result, acoustic coupling in a total system is apt to become strong.

Furthermore, when each auditorium is spaced far from the others and is, in particular, communicable through a satellite with one another, a speaker's voice sent from one microphone in a near-end auditorium is returned back to the near-end auditorium, as so called an echo electric signal, through acoustic coupling between the loudspeaker and the microphone at a far-end auditorium. Such an echo electric signal is reproduced into an acoustic noise about one second after the speaker's voice is sent.

Acoustic coupling between the loudspeaker and the microphone should be related to reverberation of a phonic sound in each auditorium. Such reverberation induces a reverberation electric signal into a send-in signal sent from the microphone. The reverberation electric signal usually lasts for a considerably long duration as compared with the echo electric signal. If the reverberation electric signal was completely suppressed or cancelled in each auditorium, the echo electric signal would not be returned back from the far-end auditorium to a near-end auditorium.

In a conventional conference communication system, a voice switch has been used to suppress the reverberation electric signal. As will later be described with reference to a few of several figures of the accompanying drawing, the voice switch comprises a first variable attenuator between a microphone and a sending path, a second variable attenuator between a loudspeaker and a receiving path, and a comparator for carrying out comparison between a send-in signal and a receive-in signal. The first and the second attenuators are controlled in accordance with a result of comparison at the comparator. With the voice switch, the reverberation electric signal is favorably removed by adjusting the first and the second attenuators as long as a total attenuation of the voice switch is comparatively small. However, when the total attenuation becomes large, an audio electric signal is widely varied in level. Such a variation brings about a phenomenon like a fading.

Alternatively, it may be possible to utilize, as an echo cancelling circuit for the conference communication system, an echo canceller used in a long-distance telephone network. However, the echo canceller has a serious problem to be solved in order to apply the echo canceller to the conference communication system, as will later be described with reference to a few figures of the accompanying drawing.

SUMMARY OF THE INVENTION

It is an object of this invention to provide an echo cancelling circuit which is capable of effectively removing a reverberation lasting a comparatively long term.

It is another object of this invention to provide an echo cancelling circuit of the type described, which is capable of keeping natural conversations.

It is a further object of this invention to provide an echo cancelling circuit of the type described, which is effectively applicable to a conference communication system.

An echo cancelling circuit to which this invention is applicable is responsive to a send-in and a receive-in signal for producing a send-out signal. The send-in and the receive-in signals have a common lower frequency band and a common higher frequency band. The send-in signal includes a reverberation signal substantially during each interval of time during which an audio signal sent from a remote party is dominant in the receive-in signal. According to this invention, the echo cancelling circuit comprises first means responsive to the send-in signal for separately producing a first low frequency input component and a first high frequency input component which are representative of the send-in signal in the lower and the higher frequency bands, respectively, and second means responsive to a circuit input signal for producing a second low frequency input component. The circuit input signal has the common lower and higher frequency bands. The second low frequency input component is representative of the circuit input signal in the lower frequency band. The circuit further comprises third means for supplying the receive-in signal to the second means as the circuit input signal, a self-adaptive echo canceller responsive to the first and the second low frequency input components for self-adaptively cancelling the reverberation signal in the lower frequency band to produce an output signal component, and fourth means responsive to the output signal component and the first high frequency input component for producing the send-out signal.

DESCRIPTION OF THE PREFERRED EMBODIMENTS

Figure 1:
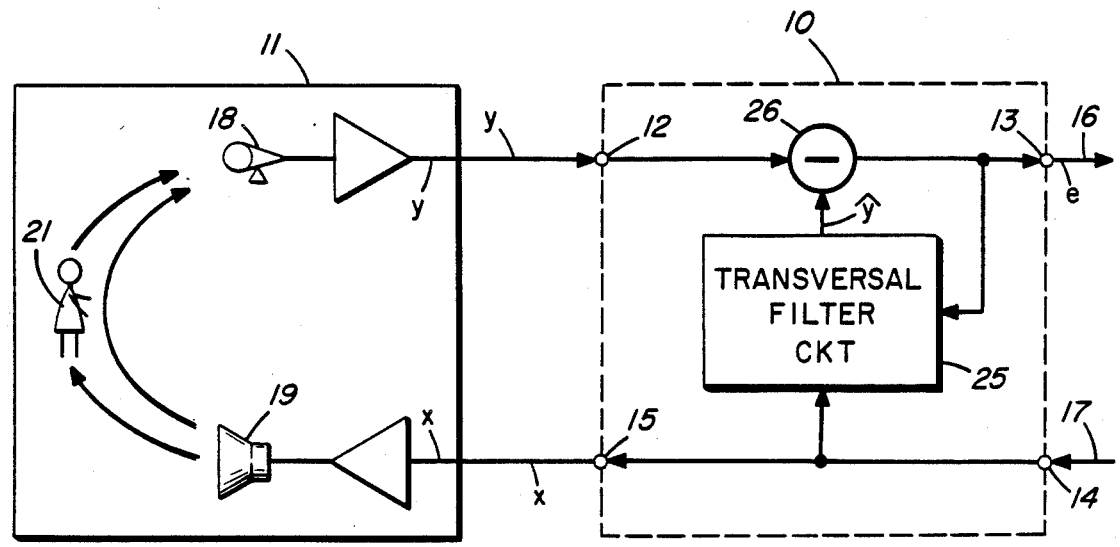
FIG. 1 shows a block diagram of a combination of a self-adaptive echo canceller with an acoustic coupling circuit for use in pointing out a problem induced from the combination.

Referring to FIG. 1, a self-adaptive echo canceller 10 is for use in combination with an acoustic coupling circuit 11 in order to point out defects resulting from a mere combination of the adaptive echo canceller 10 with the acoustic coupling circuit 11.

The adaptive echo canceller 10 has a send-in terminal 12, a send-out terminal 13, a receive-in terminal 14, and a receive-out terminal 15. The send-out and the receive-in terminals 13 and 14 are to be connected to sending and receiving paths 16 and 17, respectively, on which send-out and receive-in signals indicated at e and x appear, respectively.

Coupled to the send-in and the receive-out terminals 12 and 15, the acoustic coupling circuit 11 comprises a microphone 18 and a loudspeaker 19. When a speaker 21 makes a speech, his voice is transferred into an output acoustic signal by the microphone 18 to be supplied as a send-in signal y through an amplifier (unnumbered) to the send-in terminal 13. On the other hand, a receive-out signal is supplied from the receive-out terminal 15 through an amplifier (unnumbered) to the loudspeaker 19. The receive-out signals depicted at the same reference character as the receive-in signal x because the receive-in signal x is sent as the receive-out signal without any modification. The microphone 18 will herein be referred to, together with the accompanying amplifier, as an acoustic transmitter 18. Likewise, a combination of the loudspeaker 19 and the accompanying amplifier will be called an acoustic receiver 19.

When the acoustic coupling circuit 11 is located in a predetermined space, such as in an auditorium, the acoustic output signal inevitably results in an acoustic reverberation signal at the microphone 18 as depicted by a curved line drawn with an arrowhead from the acoustic receiver 19 to the acoustic transmitter 18. As a result, the acoustic transmitter 18 produces a reverberation electric signal as a part of the send-in signal y. Inasmuch as the reverberation electric signal alone is produced, during absence of the acoustic output signal, the reverberation electric signal will be designated by y.

It is known in the art that the adaptive echo canceller 10 comprises a transversal filter circuit 25 having a characteristic substantially equal to that of the acoustic coupling circuit 11. Responsive to the receive-in signal x, the transversal filter circuit 25 self-adaptively simulates the reverberation electric signal y from the receive-in signal x to produce a simulator output signal ŷ. The simulator output signal ŷ may be called a simulated reverberation signal and designated by ŷ.

The simulated reverberation signal ŷ and the reverberation electric signal y are supplied to a subtractor 26 to calculate a difference between the simulated reverberation signal y and the reverberation electric signal y. As a result, the subtractor 26 produces as the send-out signal e a difference signal representative of the difference. The send-out signal e is sent through the sending path 16 to a remote party.

Practically, digital operation is carried out in the adaptive echo canceller to accurately accomplish the simulation. For this purpose, the receive-in signal x and the send-in signal y are given through analog-to-digital converters, respectively, and the send-out signal e is produced through a digital-to-analog converter, although omitted from this figure for simplicity of illustration.

It is known in the art that the transversal filter 25 comprises a sequence of delay circuits and a plurality of gain controllers, each having a variable gain control coefficient. Herein, let each coefficient be represented by $h_i$ ($i = 0, 1, 2, \ldots$, or $N-1$) and that the receive-in signal x at a time or sampling point j, by $x_j$. The simulated reverberation signal $\hat{y}_j$ at the time point j is given by:

$$\hat{y}_j = \sum_{i=0}^{N-1} x_{j-i} \cdot h_i, \tag{1}$$

where $x_{j-i}$ represents a time point i sampling points prior to the time point j under consideration.

The simulated reverberation signal $\hat{y}_j$ is given by calculation of N times of multiplications and $(N-1)$ times of additions. This means that the above-mentioned calculation is carried out at every sampling point j.

A characteristic of the acoustic coupling circuit 11 is dependent on movement of attendants or equipment in the auditorium. Specifically, the acoustic coupling circuit 11 is variable with time as regards the characteristic between the loudspeaker 19 and the microphone 18. Therefore, each of the coefficients should be controlled in the transversal filter 25 to adjust a characteristic of the filter 25 to that of the acoustic coupling circuit 11. According to gradient algorithm, a new coefficient $h_i^N$ is calculated with reference to a former coefficient $h_i^F$ and is given by:

$$h_i^N = h_i^F + g \cdot x_{j-i} e_j, \tag{2}$$

where g represents a normalizing factor dependent on electric power of the term of $x_{j-i}$.

It is readily understood from Equation (2) that the new coefficient $h_i^N$ is given by adding a certain value to the former coefficient $h_i^F$. In other words, the former coefficient $h_i^F$ is modified into the corresponding new coefficient. Such modification should be carried out at each sampling point j as regards every one of the coefficients, N in number. Thus, the illustrated echo canceller can cancel the reverberation electric signal and an echo electric signal, known in the art, by self-adaptively adjusting each coefficient of the transversal filter 25.

The adaptive echo canceller needs the calculation shown in Equation (1) and the modification shown in Equation (2) at each sampling point.

It is assumed that an audio electric signal, such as the receive-in signal, the send-in signal, and the reverberation electric signal, has a frequency band not higher than f (Hz). It is known in the art that a sampling signal should have a sampling frequency fs not less than 2f (Hz) and, as a result, has a sampling period T equal to 1/fs (second).

Herein, every factor of the filter 25 corresponds to an impulse response appearing during each sampling period T. When the filter 25 has the factors equal in number to N, it can represent an impulse response having a total time length equal to TN. A reverberation time is defined by a duration during which a reverberation is reduced to −60 dB. The reverberation time reaches to about several hundreds of milliseconds even when sound or acoustic absorption is applied to an auditorium to some extent. In other words, the longest impulse response becomes several hundreds of milliseconds.

Herein, let the impulse response of the filter 25 be neglected after 200 milliseconds. Even in this case, the number of N would become 2000 when the sampling frequency is 10 kHz, namely, the sampling period T is 100 microseconds.

As mentioned above, the filter should carry out about two thousand times of individual calculations of a pair of multiplication and addition in accordance with Equation (1) and, moreover, the modification of two thousands of the coefficients in accordance with Equation (2).

This means that each of the calculations should be performed during 50 nanoseconds in the filter. Implementation of such a filter is considerably difficult. Even if the realization is possible, the filter inevitably become complicated and can not be readily used.

It is possible to limit the impulse response to a duration shorter than 200 milliseconds. In this method, modification of each coefficient becomes incomplete by adverse affection of the impulse response appearing after the response is cut off.

Anyway, the adaptive echo canceller 10 has not been utilized satisfactorily for the time being when applied to the long-distance conference communication system.

Figure 2:
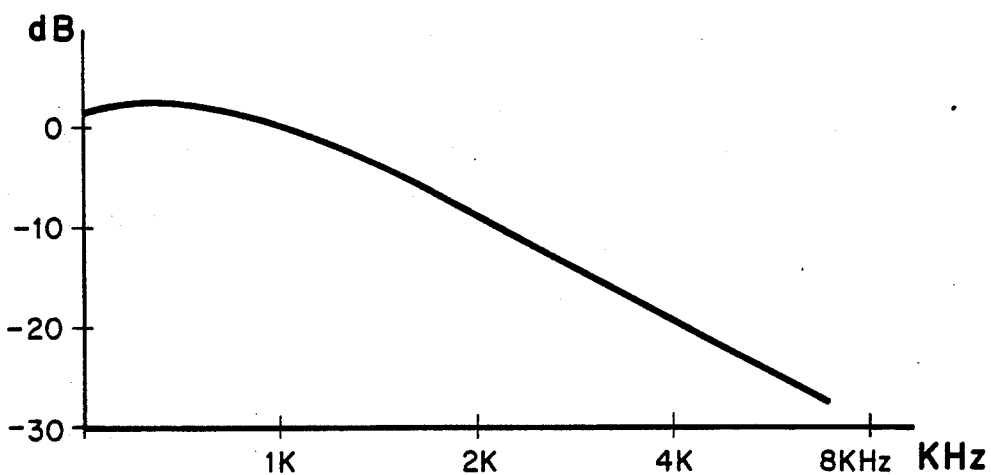
FIG. 2 is a graphical representation of a frequency distribution of an audio electric signal.

Referring to FIG. 2, a curve graphically shows a frequency distribution of an audio electric signal, which may be the send-in signal or the receive-in signal, as illustrated by spectra of electric power. The audio electric signal includes a lower frequency component and a higher frequency component within an audio frequency band divisible at a predetermined frequency of, for example, 1.7 kHz into a lower and a higher frequency band, respectively. As shown in FIG. 2, the lower frequency component has a considerably higher intensity than the higher frequency component.

From this fact, it is readily understood that the reverberation electric signal comprises a lower and a higher reverberation component in the lower and the higher frequency bands, respectively, while the receive-in signal comprises a lower and a higher receive-in component in the lower and the higher frequency bands, respectively.

Under the circumstances, it may be said that the send-out signal e substantially becomes free from the reverberation electric signal y if the lower reverberation component is completely cancelled in the send-in signal y with the higher reverberation component slightly cancelled therein.

Figure 3:
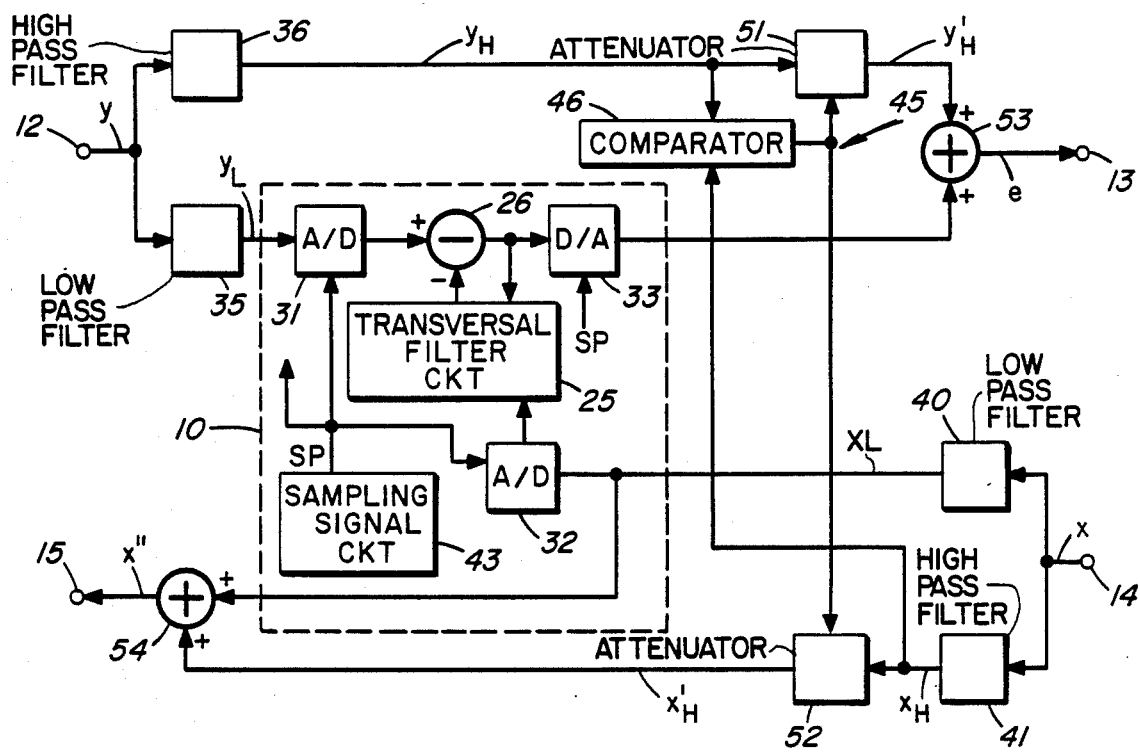
FIG. 3 is a block diagram of an echo cancelling circuit according to a first embodiment of this invention.

Referring to FIG. 3, an echo cancelling circuit according to a first embodiment of this invention comprises similar parts designated by like reference numerals and is operable with similar signals indicated by like reference symbols. The acoustic coupling circuit is removed from the figure. The illustrated adpative echo canceller 10 comprises a first analog-to-digital converter 31 coupled to the subtractor 26, a second analog-to-digital converter 32 coupled to the transversal filter circuit 25, and a digital-to-analog converter 33 coupled to the subtractor 26. Operation of the converters 31, 32, and 33 will be described later.

A first low pass filter 35 and a first pass filter 36 are supplied through the send-in terminal 12 with the send-in signal including a reverberation electric signal substantially during each interval of time during which an audio signal sent from a remote party is dominant in the receive-in signal. Both of the filters 35 and 36 have a common cutoff frequency at 1.7 kHz. The first low pass filter 35 and the first high pas filter 36 separately produce a first low frequency input component and a first high frequency input component which are representative of the send-in signal y in the lower and the higher frequency bands, respectively. During production of the reverberation electric signal, the lower and the higher reverberation components designated by $y_L$ and $y_H$, respectively, appear as the first low frequency input component and the first high frequency input component, respectively. Thus, a pair of the filters 35 and 36 may be called first means for producing the lower and the higher reverberation components.

In the illustrated circuit, the receive-in signal x is directly delivered to both of a second low pass filter 40 and a second high pass filter 41 as a circuit input signal having a second low frequency input component and a second high frequency component corresponding to the lower and the higher receive-in components designated at $x_L$ and $x_H$. An electrical connection or conductor may be called third means for supplying the receive-in signal to the filters 40 and 41 as the circuit input signal. The circuit input signal may often be referred to as an incoming signal hereinafter.

The filters 40 and 41 have the same characteristics as the first low pass filter 35 and the first high pass filter 36, respectively, and produces the lower and the higher receive-in components $x_L$ and $x_H$, respectively. A combination of the second filters 40 and 41 is operable as second means for separately producing the lower and the higher receive-in components $x_L$ and $x_H$, namely, the second low frequency input and the second high frequency input components.

Coupled to the first and the second low pass filters 35 and 40, the adaptive echo canceller 10 receives the lower reverberation component $y_L$ and the lower receive-in component $x_L$ at the first and the second analog-to-digital converters 31 and 32, respectively.

Each of the first and the second analog-to-digital converters 31 and 32 is operable in response to a sampling signal SP delivered from a sampling pulse generator 43. A sampling frequency of the sampling signal SP may be equal to about 4 kHz because each of the lower reverberation and the lower receive-in components falls within the lower frequency band which is lower than 2 kHz. Therefore, the sampling period becomes 250 microseconds.

As discussed with reference to FIG. 1, the transversal filter circuit 25 may have the impulse response of 200 milliseconds. Under the condition, the number of the coefficients becomes 800 in the transversal filter circuit 25. Calculation shown in Equation (1) may be, therefore, carried out during 250 microseconds. This means that an individual calculation of a pair of the multiplication and the addition may be completed within about 300 nanoseconds. Such individual calculation is readily accomplished by the use of a conventional circuit device.

Further referring to FIG. 3, each of the lower reverberation component $y_L$ and the lower receive-in component $x_L$ has a level variable with time. Let the levels of the lower reverberation and the lower receive-in components $y_L$ and $x_L$ be called first and second component levels, respectively.

The first analog-to-digital converter 31 converts the lower reverberation component $y_L$ to a first digital signal representative of a first digital value dependent on the first component level. Likewise, the lower receive-in component $x_L$ is converted by the second analog-to-digital converter 32 to a second digital signal representative of a second digital value dependent on the second component level.

Responsive to the second digital signal, the transversal filter circuit 25 is operable to self-adaptively cancel the lower reverberation component $y_L$ as well as a lower frequency component of an echo signal in the manner described with reference to FIG. 1. More particularly, the transversal filter circuit 25 is supplied, in addition to the second digital signal, with an input digital signal of an input digital value, as will presently become clear. The transversal filter circuit 25 simulates a simulated digital value from the second and the input digital values to produce a simulator output signal representative of the simulated digital value.

Supplied with the first digital signal and the simulator output signal, the subtractor 26 subtracts the simulated digital value from the first digital value to provide a difference digital value and to produce a difference digital signal representative of the difference digital value. The difference digital signal is delivered to the transversal filter circuit 25 as the input digital signal and to the digital-to-analog converter 33.

The digital-to-analog converter 33 converts the difference digital signal to a converted analog component e' in response to the sampling signal SP described before. The converted analog component e' has a level dependent on the difference digital level and falls within the lower frequency band, as is the cases with the lower reverberation component $y_L$. The converted analog component e' is related to the send-out signal e and may, therefore, be named a lower send-out component.

The illustrated self-adaptive echo canceller 10 may be an echo canceller disclosed in U.S. Pat. No. 4,064,379 issued to Otakar Anthony Horna.

The echo cancelling circuit further comprises a voice switch (collectively depicted at 45) responsive to the higher reverberation component $y_H$ and the higher receive-in component $x_H$ supplied through the first and the second high pass filters 36 and 41. Briefly, the voice switch 45 serves to suppress the higher reverberation component $y_H$ to produce a higher send-out component $y_H'$ which is equivalent to the remaining part of the send-out signal e and may, therefore, be referred to as suppressor means, although somewhat different from an echo suppressor.

More particularly, the voice switch 45 comprises a comparator 46 responsive to the higher reverberation component $y_H$ and the higher receive-in component $x_H$ for producing a control signal CT. As mentioned heretobefore, the higher reverberation component $y_H$ and the higher receive-in component $x_H$ have the first and the second signal levels, respectively. The control signal CT takes a first and a second control level when the first signal level is lower and not lower than the second signal level, respectively. The first and the second control levels may be a logic "0" level and a logic "1" level, respectively, or may be given by variable analog levels lower and not lower than a reference level appearing when the first and the second signal levels are equal to each other, respectively.

The voice switch 45 further comprises first and second attenuators 51 and 52 coupled to the first and the second high pass filters 36 and 41, respectively. Responsive to the control signal CT and the higher reverberation component $y_H$ of the first signal level, the first attenuator 51 adjusts the first signal level to produce the higher send-out component $y_H'$. When the control signal CT takes the first and the second control signals, the first attenuator 51 gives the higher send-out component a reduced and a raised (reverberation) level to which the first signal level is reduced and raised relative to each other. In other words, high and low attenuations occurs in the higher reverberation component $y_H$ in response to the first and the second control signals, respectively.

In the voice switch 45, total attenuation of both attenuators may not exceed about 10 dB because the higher reverberation component $y_H$ is not plentiful in comparison with the lower reverberation component $y_L$. Natural conversation is not adversely affected by adjusting the first and the second attenuators 51 and 52 within the above-mentioned total attenuation.

The higher send-out signal $y_H'$ is delivered to an adder 53 together with the lower send-out signal e' to produce the send-out signal e. The send-out signal e is substantially free from the reverberation electric signal because a major part of the reverberation electric signal y, namely, the lower reverberation component yL is reduced to about 30 dB by the adaptive echo canceller 10 and a minor part of the reverberation electric signal, namely, the higher reverberation component $y_H$ is suppressed in the above-mentioned manner by the use of the voice switch 45. Thus, a combination of the voice switch 45 and the adder 53 may be called fourth means for producing the send-out signal e.

Supplied with the higher receive-in component $x_H$ of the second signal level and the control signal CT, the second attenuator 52 is operated in contrast with operation of the first attenuator 51, in order to adjust the second signal level. As a result, the second attenuator 52 produces, as a part of the receive-out signal x', a partial receive-out component $x_H'$ which takes a raised and a reduced receive-out level to which the second signal level is raised and reduced relative to each other when the control signal CT takes the first and the second control levels, respectively.

The illustrated echo cancelling circuit further comprises an additional adder 54 responsive to the lower receive-in and the partial receive-out components $x_L$ and $x_H'$ to produce the receive-out signal x". Thus, the adder 53 and the additional adder 54 may be called third and fourth means, respectively.

The voice switch 45 may be a voice switch described in U.S. Pat. No. 3,860,756 issued to Tsuyoshi Shinoi et al.

Instead of the voice switch 45, use is possible of an echo suppressor as described in U.S. Pat. No. 4,005,277 issued to Takashi Araseki et al and assigned to the present assignee. The echo suppressor comprises a comparator similar in operation to that illustrated in conjunction with FIG. 3 and a switch substituted for the first attenuator 51 without the second attenuator 52. Consequently, the higher receive-in component $x_H$ is directly supplied from the second high pass filter 41 to the receive-out terminal 15.

More particularly, the comparator of the echo suppressor supplies a switching signal to the switch circuit when the first signal level is lower than the second signal level. Responsive to the switching signal, the switch circuit produces the higher send-out component in which the higher reverberation component is substantially suppressed. Otherwise, the higher send-out component is kept substantially as it is.

From this fact, it is readily understood that the first and the second attenuators of the voice switch 45 may be considered as switching means, as is the case with the echo suppressor.

Figure 4:
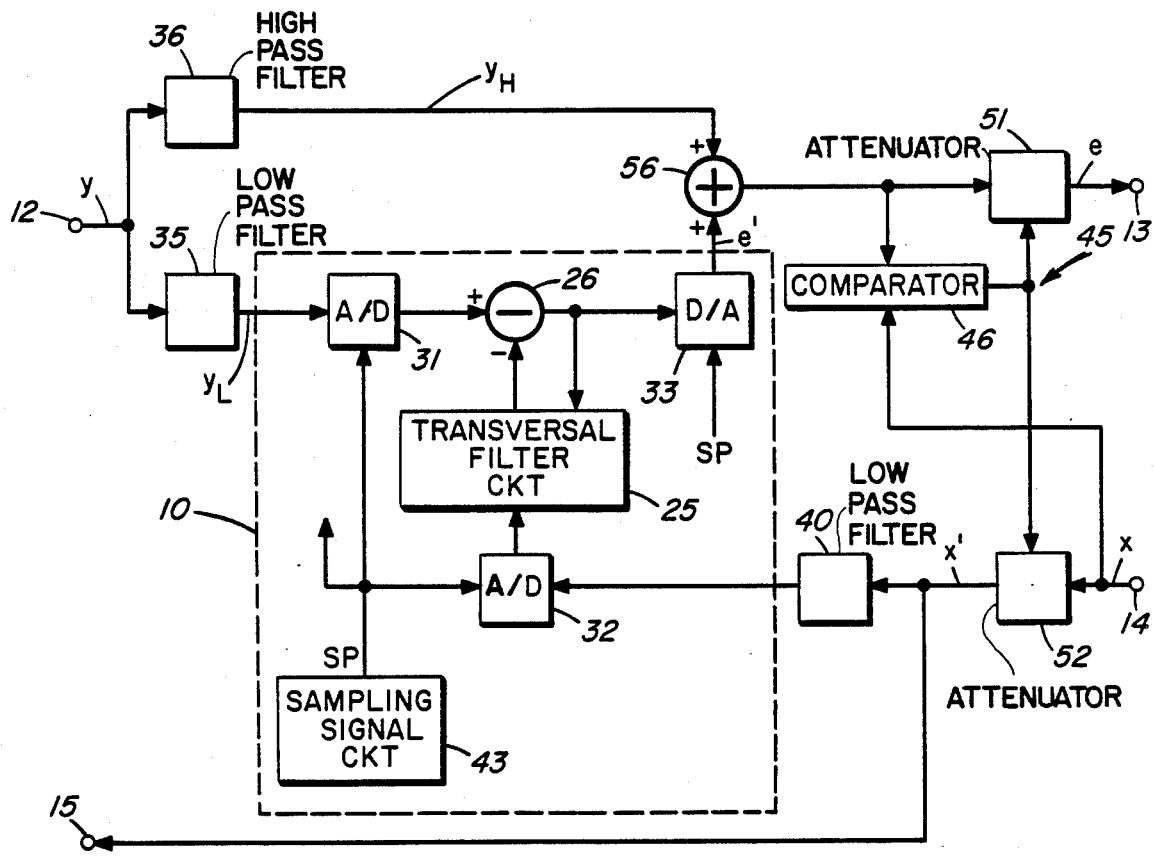
FIG. 4 is a block diagram of an echo cancelling circuit according to a second embodiment of this invention.

Referring to FIG. 4, an echo cancelling circuit according to a second embodiment of this invention comprises similar parts designated by like reference numerals. Like in FIG. 3, the echo cancelling circuit is supplies with the reverberation electric signal y as a part of the send-in signal and with the receive-in signal x to produce the receive-out signal x' and the send-out signal e. The reverberation electric signal y has the lower and the higher reverberation components $y_L$ and $y_H$ in the lower and the higher frequency bands, respectively. The receive-in signal x comprises the lower and the higher receive-in components $x_L$ and $x_H$ in the lower and the higher frequency bands, respectively.

The reverberation electric signal y is divided into the lower and the higher reverberation components $y_L$ and $y_H$ by the first low pass filter 35 and the first high pass filter 36. Thus, a combination of the first filters 35 and 36 may be called a dividing circuit. The lower reverberation component $y_L$ is sent to the adaptive echo canceller 10.

The illustrated echo cancelling circuit comprises the second low pass filter 40 alone without the second high pass filter 41 illustrated in FIG. 3. The second low pass filter 40 is supplied with an incoming receive-in signal x', which will be described later in detail. The incoming receive-in signal x' comprises a lower and a higher incoming component in the lower and the higher frequency bands, respectively.

The lower incoming component is derived by the second low pass filter 40 to be sent to the second analog-to-digital converter 32. Hence, the second low pass filter 40 serves to derive the lower incoming component from the incoming receive-in signal x'.

Responsive to the lower reverberation component $y_L$ and the lower incoming component, the adaptive echo canceller 10 self-adaptively cancels the lower reverberation component $y_L$ as well as a lower echo signal component to produce a reverberation cancelled component as a lower send-out component e'. The illustrated adaptive echo canceller 10 is similar in structure and operation to that illustrated with reference to FIG. 3 except that the lower incoming component is substituted for the lower receive-in component $x_L$ illustrated in FIG. 3. Operation and structure are not described about the adaptive echo canceller 10 any longer.

Anyway, the lower send-out component e' is sent from the digital-to-analog converter to an adder circuit or combiner 56 and is substantially free from the lower reverberation component $y_L$. In addition, the lower send-out component e' has the level dependent on the difference digital level, as described with reference to FIG. 3.

Coupled to the adaptive echo canceller 10 and the first high pass filter 36, the adder circuit 56 adds the lower send-out component e' to the higher reverberation component $y_H$ to produce a combiner output signal representative of a combination of the higher reverberation component $y_H$ and the lower send-out component e'. Inasmuch as the higher reverberation component $y_H$ has not been suppressed yet, the combiner output signal accompanies the higher reverberation component $y_H$.

In FIG. 4, the illustrated voice switch 45 is supplied with the combiner output signal and the receive-in signal x. The voice switch 45 serves to suppress the higher reverberation component accompanied by the combiner output signal by controlling the combiner output signal and the receive-in signal x to supply the sending path with a controlled combiner output signal as the send-out signal e and to supply the second low pass filter 40 with a controlled receive-in signal as the incoming receive-in signal x'. The receive-in signal x' is sent to the receive-out terminal 15 as the receive-out signal.

More particularly, the voice switch 45 comprises the comparator 46, the first attenuator 51, and the second attenuator 52. The comparator 46 compares levels of the combiner output signal and the receive-in signal x to produce a control signal CT. When the level of the combiner output signal is lower and not lower than the level of the receive-in signal x, the control signal CT takes a first and a second control level, respectively. The first attenuator 51 gives high attenuation to the combination signal in response to the first control level. The resultant combiner output signal is reduced in level and produced as the send-out signal e. On the other hand, the first attenuator 51 gives low attenuation to the combiner output signal in response to the second control level and, as a result, the level of the combiner output signal is raised relative to each other.

With the first attenuator 51, the higher reverberation signal is also satisfactorily suppressed during presence of the first control signal.

Responsive to the first and the second control levels, the second attenuator 52 adjusts the receive-in signal x to produce the incoming receive-in signal x'. Specifically, the level of the receive-in signal x is raised and reduced relative to each other when the control signal CT takes the first and the second control levels, respectively. The resultant receive-in signal x is delivered to the second low pass filter 40 as the incoming receive-in signal and to the receive-out terminal 15 as the receive-out signal x'.

In place of the voice switch 45, use is possible of an echo suppressor, as discussed in conjunction with FIG. 3. In this case, the receive-in signal x is directly delivered to the second low pass filter 40 without passing through the second attenuator 52. In other words, the receive-in signal x is sent as the controlled receive-in signal to the second low pass filter 40 and to the receive-in terminal 15. Thus, the receive-in signal x is equivalent to the controlled receive-in signal x' which is not subject to any attenuation.

Figure 5:
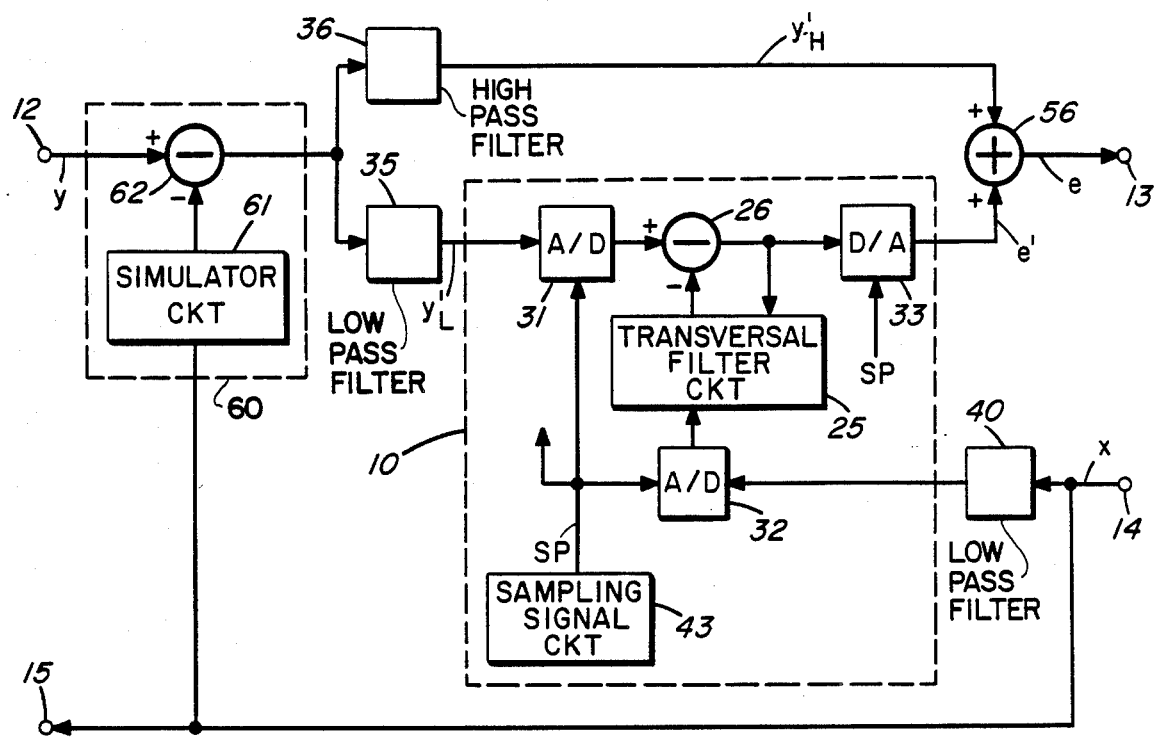
FIG. 5 is a block diagram of an echo cancelling circuit according to a third embodiment of this invention.

Referring to FIG. 5, an echo cancelling circuit according to a third embodiment of this invention is similar to that illustrated with reference to FIG. 4 except that a non-adaptive, namely, fixed echo canceller 60 is substituted for the voice switch 45 and is connected to the send-in and the receive-out terminals 12 and 15. Responsive to the reverberation electric signal y supplied through the send-in terminal 12 and the receive-in signal x delivered from the receive-in terminal 14, the non-adaptive echo canceller 60 processes the reverberation electric signal y as will presently be described. The non-adaptive echo canceller 60 produces a reverberation processed signal y'. The reverberation processed signal y' has a lower and a higher processed component in the lower and the higher frequency bands, respectively. The lower and the higher processed signals correspond to the first low frequency input component and the first high frequency input component, respectively, as described with reference to FIG. 3.

As mentioned in conjunction with FIG. 2, the lower reverberation component is considerably plentiful in comparison with the higher reverberation component in the reverberation electric signal y. Therefore, the lower reverberation component is somewhat left in the lower processed component even after passing through the non-adaptive echo canceller 60. This means that the lower processed component includes the lower reverberation component reduced by the non-adaptive echo canceller 60. On the other hand, the higher reverberation component is substantially exempted from the lower processed component by the non-adaptive echo canceller 60.

More particularly, the non-adaptive echo canceller 60 comprises a simulating circuit 61 having a plurality of gain control coefficients each of which is smaller in number than those of the self-adaptive echo canceller 10. Inasmuch as each of the gain control coefficients is constant in the simulating circuit 61, non-adaptive operation is carried out in the non-adaptive echo canceller 60.

Responsive to the receive-in signal x, the simulating circuit 61 simulates the reverberation electric signal y by the use of the constant gain control coefficients to supply a simulated reverberation signal $\tilde{y}$ to a subtracting circuit 62. The subtracting circuit 62 subtracts the simulated reverberation signal $\tilde{y}$ from the reverberation electric signal $\tilde{y}$ to produce the reverberation processed signal y'.

The simulated reverberation signal $\tilde{y}$ cannot track a variation of acoustic coupling between a loudspeaker and a microphone because the gain control coefficients are constant. Therefore, the simulated reverberation signal $\tilde{y}$ is substantially equivalent to the acoustic reverberation signal directly propagated from the loudspeaker to the microphone. Thus, the non-adaptive echo canceller 60 serves to mainly cancel the reverberation electric signal resulting from the directly propagated acoustic reverberation signal. Taking the above into consideration, it is readily understood that the simulating circuit 61 may be constituted by a mere delay circuit for delaying the receive-in signal x or an analog simulator.

As the non-adaptive echo canceller, use is possible of a blockless echo suppressor disclosed by Akira Miura et al in IEEE Transactions on Communication Technology, Vol. COM-17, No. B 4 (August 1969), pp. 489–495.

The reverberation processed signal y' is supplied to the first low pass filter 35 and the first high pass filter 36 to be separated into the lower and the higher processed components $y_L'$ and $y_H'$, respectively.

The receive-in signal x is delivered to the second low pass filter 40 to separate the lower receive-in component and is also delivered to the receive-out terminal 15 as the receive-out signal.

Responsive to the lower processed component $y_L'$ and the lower receive-in component, the self-adaptive echo canceller 10 self-adaptively cancels the lower reverberation component included in the lower processed component to produce a canceller output signal as the lower send-out signal e'.

The self-adaptive echo canceller 10 is similar in operation and structure to that illustrated with reference to FIG. 3 except that the lower processed component $y_L'$ is substituted for the lower reverberation component illustrated in FIG. 3. Accordingly, operation and structure will not be described any longer as regards the self-adaptive echo canceller 10.

Coupled to the first high pass filter 36 and the self-adaptive echo canceller 10, the adder 56 adds the lower send-out signal to the higher processed signal $y_H'$ to produce the send-out signal e.

Incidentally, the constant gain control coefficients may be adjusted in practical use to make them conform with acoustic coupling.

Figure 6:
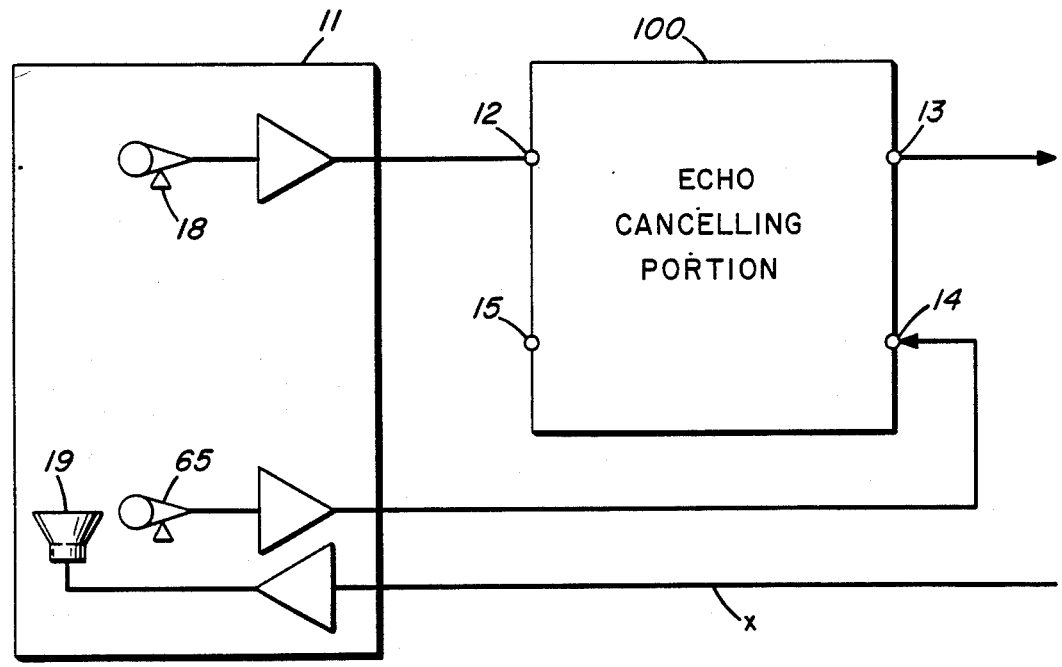
FIG. 6 shows a block diagram of a combination of a specialized acoustic coupling circuit with an echo cancelling circuit according to the instant invention.

Referring to FIG. 6, an echo cancelling circuit according to a fourth embodiment of this invention comprises an echo cancelling circuit illustrated in either one of FIGS. 3, 4, and 5 as an echo cancelling portion indicated by 100. The echo cancelling portion 100 is connected to a particular acoustic coupling circuit 11. The particular acoustic coupling circuit 11 comprises a loudspeaker 19 similar to that illustrated in FIG. 1. The loudspeaker 19 is connected to the receiving path and supplied with the receive-in signal x for reproducing an acoustic output representative thereof. In addition to the microphone 18 connected to the send-in terminal 12, an additional or auxiliary microphone 65 is nearer to the loudspeaker 19 than the microphone 18 to convert the acoustic output to a local signal. The local signal is supplied to the receive-in terminal 14.

Thus, a combination of the loudspeaker 19 and the auxiliary microphone 65 is operable to supply the receive-in terminal 14 with the receive-in signal as the local signal and, therefore, referred to as third means.

In this structure, the auxiliary microphone 65 directly picks up the acoustic output emitted from the loudspeaker 19. Therefore, the local signal includes a distortion resulting from a non-linear characteristic of the loudspeaker 19. Such a distortion can be eliminated by the echo cancelling portion 100. As a result, the illustrated structure can remove the distortion component in addition to the reverberation electric signal y produced from the microphone 18.

As the auxiliary microphone 65 is nearer to the loudspeaker 19 than the microphone 18, it is possible to prevent the auxiliary microphone 65 from unfavorably picking up any phonic sound produced by the microphone 18.

While this invention has thus far been described in conjunction with a few embodiments thereof, it is readily possible for those skilled in the art to practice this invention in various other manners. For example, use is possible of a center clipper known in the art, instead of the voice switch illustrated in each of FIGS. 3 and 4. In FIG. 3, the comparator 46 may be directly supplied with the reverberation electric signal y and the receive-in signal x without passing through the first and the second high pass filters.

What is claimed is:

1. An echo cancelling circuit responsive to a send-in signal, and a receive-in signal from a source external to said circuit for producing a send-out signal, said send-in and said receive-in signals having a common first frequency band and a common second frequency band, said first frequency band having frequencies in a range that are lower than the frequencies in the range of said second frequency band, said send-in signal including a reverberation signal during each interval of time that an audio signal sent from a remote party is dominant in said receive-in signal, said echo cancelling circuit comprising:

first means responsive to said send-in signal for separately producing a first low frequency input signal component and a first high frequency input signal component which are representative of the send-in signal in said first and said second frequency bands, respectively;

second means reponsive to a circuit input signal for producing a second low frequency input signal component, said circuit input signal having said common first and second frequency bands, said second low frequency input signal component being representative of the circuit input signal in said first frequency band;

third means for supplying said receive-in signal to said second means as said circuit input signal;

a self-adaptive echo canceller responsive to said first and said second low frequency input signal components for self-adaptively cancelling the reverberation signal in said first frequency band to produce an output signal; and fourth means responsive to said output signal and said first high frequency input signal component for producing said send-out signal.

2. An echo cancelling circuit as claimed in claim 1, said first and said second low frequency input signal components having a first and a second signal amplitude, respectively, said first signal amplitude being variable with time, said second signal amplitude being variable with time primarily dependent on the presence and absence of said audio signal in said receive-in signal, wherein said self-adaptive echo canceller comprises:

a first analog-to-digital converter for converting said first low frequency input signal component to a first digital signal whose value is a funcion of said first signal amplitude;

a second analog-to-digital converter for converting said second low frequency input signal component to a second digital signal which is a function of said second signal amplitude;

digital simulating means responsive to said second digital signal and an input digital signal representative of an input signal amplitude for digitally self-adaptively producing a simulated digital signal;

a digital subtractor responsive to said first digital signal and said simulated digital signal for subtracting said simulated digital signal from said first digital signal to produce a difference digital signal;

means for supplying said difference digital signal to said digital signal producing means as said input digital signal to substantially cancel said reverberation signal by said simulated digital signal; and a digital-to-analog converter for converting said difference digital signal to an analog signal which serves as said output signal.

3. An echo cancelling circuit as claimed in claims 1 or 2, said first high frequency input signal component having a first high frequency input amplitude variable with time, wherein;

said second means comprises means responsive to said circuit input signal for producing a second high frequency input signal component representative of the circuit input signal in said second frequency band, said second high frequency input signal component having a second high frequency input amplitude which is variable with time primarily dependent on the presence and absence of said audio signal in said receive-in signal; and said fourth means comprising:

a comparator responsive to said first and said second high frequency input signal components for producing a control signal which takes a first and a second control level when said first high frequency input level is lower and not lower than said second high frequency input level, respectively;

adjusting means responsive to said first high frequency input signal component and said control signal for adjusting said first high frequency input amplitude to produce a first high frequency adjusted component with said first high frequency adjusted component made to have amplitudes to which said first high frequency input amplitude is reduced and raised when said control signal takes said first and said second control levels, respectively; and an adder for adding said output signal and said first high frequency adjusted component into said send-out signal.

4. An echo cancelling circuit as claimed in claim 3, wherein:

said fourth means further comprises additional adjusting means responsive to said second high frequency input signal component and said control signal for adjusting said second high frequency input level to produce a third high frequency signal component with said third high frequency signal component made to have levels to which said second high frequency input level is reduced and raised when said control signal takes said second and said first control levels, respectively;

said third means being a conductor; and said echo cancelling circuit further comprising an additional adder for adding said second low frequency input signal component and said second high frequency signal component into a signal which is for supply to a loudspeaker for reproducing an acoustic output representative of said audio signal.

5. An echo cancelling circuit as claimed in claim 3, wherein said third means comprises:

a loudspeaker responsive to said receive-in signal for producing an acoustic output representative thereof;

an auxiliary microphone adjacent to said loudspeaker for converting said acoustic output to a local signal representative thereof; and means for supplying said local signal to said second means as said circuit input signal.

6. An ecoho cancelling circuit as claimed in claims 1 or 2, said first high frequency input signal component having a first high frequency input level variable with time, wherein:

said second means comprises means responsive to said circuit input signal for producing a second high frequency input signal component representative of the circuit input signal in said higher frequency band, said second high frequency input signal component having a second high frequency input level which is variable with time and primarily dependent on presence and absence of said audio signal in said receive-in signal;

said fourth means comprising:

a comparator responsive to said first and said second high frequency input signal components for producing a control signal which takes a first and a second control level when said first high frequency input level is lower and not lower than said second high frequency input level, respectively;

switching means responsive to said control signal for switching said first high frequency input signal component to produce a first high frequency signal component in which said first high frequency input component is substantially suppressed and is kept substantially as it is when said control signal takes said first and said second control levels, respectively; and an adder for adding said output signal and said first high frequency signal component into said send-out signal.

7. An echo cancelling circuit as claimed in claim 6, wherein:

said fourth means further comprises additional switching means responsive to said control signal for switching said second high frequency input component signal into a second high frequency signal component in which said second high frequency input signal component is substantially suppressed and is kept substantially as it is when said control signal takes said second and said first control levels, respectively;

said third means being a conductor;

said echo cancelling circuit further comprising an additional adder for adding said second low frequency input signal component and said second high frequency signal component into a signal which is for supply to a loudspeaker for reproducing an acoustic output representative of said audio signal.

8. An echo cancelling circuit as claimed in claim 6, wherein said third means comprises:

a loudspeaker responsive to said receive-in signal for producing an acoustic output representative thereof;

an auxiliary microphone adjacent to said loudspeaker for converting said acoustic input to a local signal representative thereof; and means for supplying said local signal to said second means as said circuit input signal.

9. An echo cancelling circuit as claimed in claims 1 or 2, said circuit input signal having an input signal amplitude variable with time primarily dependent on presence and absence of said audio signal in said receive-in signal, wherein:

said fourth means comprises:

an adder for adding said output signal and said first high frequency input signal component into a sum signal having an amplitude that is variable with time;

a comparator responsive to said sum signal and said receive in signal for producing a control signal which takes a first and a second control level when the amplitude of said sum signal is lower and not lower than said input signal amplitude, respectively; and first adjusting means responsive to said sum signal and said control signal for adjusting the amplitude of said sum signal to produce said send-out signal with said send-out signal made to have amplitudes to which said sum level is reduced and raised when said control signal takes said first and said second control levels, respectively;

said third means comprising:

second adjusting means responsive to said receive-in signal and said control signal for adjusting said receive-in signal level to produce an adjusted signal with said adjusted signal made to have amplitudes to which said receive-in signal is reduced and raised when said control signal takes said second and said first control levels, respectively; and means for supplying said adjusted signal to said second means as said circuit input signal.

10. An echo cancelling circuit as claimed in claim 1, wherein said third means is a conductor.

11. An echo cancelling circuit as claimed in claim 9, wherein said third means comprises:

a loudspeaker responsive to said receive-in signal for producing an acoustic output representative thereof;

an auxiliary microphone adjacent to said loudspeaker for converting said acoustic output to a local signal; and means for supplying said local signal to said second means as said circuit input signal.

12. An echo cancelling circuit as claimed in claims 1 or 2, said circuit input signal having an input signal level variable with time primarily dependent on presence and absence of said audio signal in said receive-in signal, wherein:

said fourth means comprises:

an adder for adding said output signal and said first high frequency input signal component into a sum signal which has a sum level variable with time;

a comparator responsive to said sum signal and said circuit input signal for producing a control signal which takes a first and a second control level when said sum level is lower and not lower than said input signal level; and switching means responsive to said control signal for switching said sum signal into said send-out signal in which said sum level is substantially suppressed and is kept substantially as it is when said control signal takes said first and said second control levels, respectively.

13. An echo cancelling circuit as claimed in claim 12, wherein said third means is a conductor.

14. An echo cancelling circuit as claimed in claim 12, wherein said third means comprises:

a loudspeaker responsive to said receive-in signal for producing an acoustic output representative thereof;

an auxiliary microphone adjacent to said loudspeaker for converting said acoustic output to a local signal; and means for supplying said local signal to said second means as said circuit input signal.

15. An echo cancelling circuit as claimed in claims 1 or 2, said send-in and said circuit input signals having a send-in and an input amplitude, respectively, said send-in amplitude being variable with time, said input signal amplitude being variable with time primarily dependent on the presence and absence of said audio signal in said receive-in signal, wherein:

said first means comprises:
a simulator responsive to said circuit input signal for producing a simulated signal representative of a simulated value, said simulated value being substantially equal to the send-in amplitude during presence of said audio signal in said receive-in signal;
a subtractor for subtracting said simulated signal from said send-in signal to produce a subtracted signal; and means for separating said subtracted signal into said first low and high frequency input signal components;
said fourth means comprising an adder for adding said output signal and said first high frequency input signal component into said send-out signal.

16. An echo cancelling circuit as claimed in claim 15, wherein said third means is a conductor.

17. An echo cancelling circuit as claimed in claim 15, wherein said third means comprises:
a loudspeaker responsive to said receive-in signal for producing an acoustic output representative thereof;
an auxiliary microphone adjacent to said loudspeaker for converting said acoustic output to a local signal representative thereof; and
means for supplying said local signal to said second means as said circuit input signal.

18. A circuit having a send-in terminal, a send-out terminal, a receive-in terminal, and a receive-out terminal, said circuit being for use in combination with an acoustic transmitter which is acoustically coupled to an acoustic receiver and which is to be connected to said send-in terminal, said send-out and said receive-in terminals being connected to a sending and a receiving path, respectively, said circuit being responsive to a send-in signal from an external source and a receive-in signal supplied from said acoustic transmitter through said send-in terminal and supplied through said receive-in terminal from said external source, respectively, for supplying a send-out signal to said sending path through said send-out terminal, said acoustic transmitter being supplied with an acoustic signal which results from acoustic coupling between said acoustic transmitter and said acoustic receiver and which induces an acoustic reverberation signal at said acoustic transmitter to make the same produce a reverberation electric signal given as said send-in signal, said receive-in signal being divided into a lower and a higher frequency band, said reverberation electric signal comprising a lower and a higher reverberation signal component in said lower and said higher frequency bands, respectively, said receive-in signal comprising a lower and a higher receive-in signal component in said lower and said higher frequency bands, respectively, said circuit being operable to substantially cancel said reverberation electric signal and comprising:

first means responsive to said reverberation electric signal for separately producing said lower and said higher reverberation signal components;
second means responsive to said receive-in signal for separately producing said lower and said higher receive-in signal components;
a self-adaptive echo canceller responsive to said lower reverberation signal component and said lower receive-in signal component for self-adaptively cancelling said lower reverberation signal component to produce a lower send-out signal component;
echo suppressing means responsive to said higher reverberation signal component and said higher receive-in signal component for suppressing said higher reverberation signal component to produce a higher send-out signal component; and
third means responsive to said lower and said higher send-out signal components for producing said send-out signal.

19. A circuit as claimed in claim 18, said lower reverberation signal component and said lower receive-in signal component having a first and a second signal component amplitude, respectively, said first and second signal component amplitudes being variable with time, wherein said self-adaptive echo canceller comprises:
a first analog-to-digital converter for converting said lower reverberation signal component to a first digital signal representative of the amplitude of said lower reverberation signal component;
a second analog-to-digital converter for converting said lower receive-in signal component to a second digital signal representative of the amplitude of said lower receive-in signal component;
simulating means responsive to said second digital signal and an input digital signal representative of an input signal amplitude for self-adaptively calculating a simulated amplitude to produce a simulated digital signal representative of said simulated amplitude;
subtracting means for subtracting said simulated digital signal from said first digital signal to substantially cancel said lower reverberation signal component and to produce a difference digital signal representative of a difference between said simulated amplitude and said lower reverberation signal;
signal producing means for producing said difference digital signal as said input digital signal; and
a digital-to-analog converter for converting said difference digital signal to said lower send-out signal component with said lower send-out signal component made to have an amplitude dependent on said difference.

20. A circuit as claimed in claim 19, said higher reverberation signal component and said higher receive-in signal component having a first and a second signal amplitude, respectively, said first and said second signal amplitude being variable with time, wherein:

said echo suppressing means comprises:
a comparator responsive to said higher reverberation signal component and said higher receive-in signal component for producing a control signal which takes a first and a second control level when said first signal amplitude is lower and not lower than said second signal amplitude, respectively;
first adjusting means responsive to said higher reverberation signal component and said control signal for adjusting said first signal amplitude to produce said higher send-out signal component by giving said higher send-out signal component a reduced and a raised reverberation amplitude when said control signal takes said first and said second control levels, respectively; and second adjusting means responsive to said higher receive-in signal component and said control signal for adjusting said second signal amplitude to produce a partial receive-out signal component by giving said partial receive-out signal component a raised and a reduced receive-out level when said control signal takes said first and said second control levels, respectively;

said circuit further comprising fourth means responsive to said lower receive-in and said partial receive-out signal components for producing said receive-out signal.

21. A circuit as claimed in claim 19, said higher reverberation signal component and said higher receive-in signal component having a first and a second signal amplitude, respectively, said first and said second signal amplitudes being variable with time, wherein:

said echo suppressing means comprises:

a comparator responsive to said higher reverberation signal component and said higher receive-in signal component for producing a switching signal when said first signal amplitude is lower than said second signal amplitude; and means responsive to said higher reverberation signal component and said switching signal for producing said higher send-out signal component with said higher reverberation signal component substantially suppressed;

said circuit further comprising fourth means for producing said receive-in signal as said receive-out signal.

22. A circuit having a send-in terminal, a send-out terminal, a receive-in terminal and a receive-out terminal, said circuit being for use in combination with an acoustic transmitter which is acoustically coupled to an acoustic receiver and which is to be connected to said send-in terminal, said send-out and said receive-in terminals being connected to a sending and a receiving path, respectively, said circuit being responsive to a send-in signal for an external source and a receive-in signal supplied from said acoustic transmitter through said send-in terminal and supplied through said receive-in terminal from an external source, respectively, for supplying a send-out signal to said sending path through said send-out terminal, said acoustic transmitter being supplied with an acoustic signal which results from acoustic coupling between said acoustic transmitter and said acoustic receiver and which induces an acoustic reverberation signal at said acoustic transmitter to make the same produce a reverberation electric signal as a part of said send-in signal, said receive-in signal being divided into a lower and a higher frequency band, said reverberation electric signal comprising a lower and a higher reverberation signal component in said lower and said higher frequency bands, respectively, said circuit being operable to cancel said reverberation electric signal and comprising:

a first divider responsive to said reverberation electric signal for separately producing said lower and said higher reverberation signal components;

a second divider responsive to a divider incoming signal having a lower and a higher incoming signal component in said first and said second frequency bands, respectively, for separating said lower incoming signal component from said divider incoming signal;

a self-adaptive echo canceller responsive to said lower reverberation signal component and said lower incoming signal component for self-adaptively cancelling said lower reverberation signal component to produce a canceller output signal;

a combiner for combining said canceller output signal and said higher reverberation signal component to produce a combiner output signal;

echo suppressing means responsive to said combiner output signal and said receive-in signal for suppressing the higher reverberation signal component in said combiner output signal to produce said send-out signal and for controlling said receive-in signal to produce a controlled receive-in signal;

means for supplying said controlled receive-in signal to said second divider as said divider incoming signal; and means for producing said controlled receive-in signal as said receive-out signal.

23. A circuit as claimed in claim 22, said lower reverberation signal component and said lower incoming signal component having a reverberation amplitude and an incoming amplitude, respectively, said reverberation amplitude and said incoming amplitude being variable with time, wherein said self-adaptive echo canceller comprises:

a first analog-to-digital converter for converting said lower reverberation signal component to a first digital signal representative of the amplitude of said reverberation level;

a second analog-to-digital converter for converting said lower incoming signal component to a second digital signal representative of the amplitude of said lower incoming signal component;

simulating means responsive to said second digital signal and an input digital signal representative of an input signal amplitude for self-adaptively calculating a simulated amplitude to produce a simulated digital signal representative of said simulated amplitude;

subtracting means for subtracting said simulated digital signal from said first digital signal to substantially cancel said lower reverberation signal component and to produce a difference digital signal representative of a difference between said simulated amplitude and the amplitude of said lower reverberation signal;

signal producing means for producing said difference digital signal as said input digital signal; and a digital-to-analog converter for converting said difference digital signal to said lower send-out signal component with said lower send-out signal component made to have an amplitude dependent on said difference.

24. A circuit as claimed in claim 23, said combiner output signal and said receive-in signal having an output signal level and a receive-in signal level, respectively, both of said signal levels being variable with time, wherein:

said echo suppressing means comprises:

comparing means responsive to said combiner output signal and said receive-in signal for producing a control signal which takes a first and a second control level when said output signal level is lower and not lower than said receive-in signal level, respectively;

first adjusting means responsive to said combiner output signal and said control signal for adjusting said output signal level to produce said send-out signal by giving said combiner output signal a reduced and a raised level when said control signal takes said first and said second control levels, respectively; and second adjusting means responsive to said receive-in signal and said control signal for adjusting said receive-in signal level to produce said controller receive-in signal by giving said receive-in signal a raised and a reduced receive-in level when said control signal takes said first and said second control levels, respectively.

25. A circuit as claimed in claim 23, said combiner output signal and said receive-in signal having an output signal level and a receive-in signal level, respectively, both of said signal levels being variable with time, wherein:

a comparator responsive to said combiner output signal and said receive-in signal for producing a switching signal when said output signal level is lower than said receive-in signal level; and means responsive to said combiner output signal and said switching signal for producing said send-out signal with the higher reverberation signal component substantially cancelled; and means for directly producing said receive-in signal as said controlled receive-in signal.

26. A circuit having a send-in terminal, a send-out terminal, a receive-in terminal, and a receive-out terminal, said circuit being for use in combination with an acoustic transmitter which is acoustically coupled to an acoustic receiver and which is to be connected to said send-in terminal, said send-out and said receive-in terminals being connected to a sending and a receiving path, respectively, said circuit being responsive to a send-in signal from an external source and a receive-in signal supplied from said acoustic transmitter through said send-in signal terminal and supplied through said receive-in terminal from said external source, respectively, for supplying a send-out signal to said sending path through said send-out terminal, said acoustic transmitter being supplied with an acoustic signal which results form acoustic coupling between said acoustic transmitter and said acoustic receiver and which induces an acoustic reverberation signal at said acoustic transmitter to make the same produce a reverberation electric signal given as said send-in signal, said receive-in signal being divided into a lower and a higher frequency band, said reverberation signal comprising a lower and a higher reverberation signal component in said lower and said higher frequency bands, respectively, said receive-in signal comprising a lower and a higher receive-in signal component in said lower and said higher frequency bands, respectively, said circuit being operable to substantially cancel said reverberation electric signal and comprising:

processing means responsive to said reverberation electric signal and said receive-in signal for processing said reverberation electric signal with reference to said receive-in signal to produce a reverberation processed signal having a lower and a higher processed signal component in said first and said second frequency bands, respectively, said lower processed signal component including said lower reverberation signal component reduced, said higher processed signal component including substantially no higher reverberation signal component;

a first separator responsive to said reverberation processed signal for separately producing said lower and said higher processed signal components;

a second separator for separating said lower receive-in signal component from said receive-in signal;

a self-adaptive echo canceller responsive to said lower processed signal component and said lower receive-in signal component for self-adaptively cancelling the lower reverberation signal component included in said lower processed signal component therefrom to produce a canceller output signal; and an adder for adding said canceller output signal and said higher processed signal to produce said send-out signal.

27. A circuit as claimed in claim 26, said lower processed signal component and said lower receive-in signal component having a processed amplitude and a receive-in amplitude, respectively, both of said amplitudes being variable with time, wherein said self-adaptive echo canceller comprises:

a first analog-to-digital converter for converting said lower processed signal component to a first digital signal representative of said processed amplitude;

a second analog-to-digital converter for converting said lower receive-in component to a second digital signal representative of said receive-in level;

simulating means responsive to said second digital signal and an input digital signal representative of an input signal amplitude for self-adaptively calculating a simulated amplitude to produce a simulated digital signal representative of said simulated amplitude;

subtracting means for subtracting said simulated digital signal from said first digital signal to substantially cancel said lower reverberation signal component and to produce a difference digital signal representative of a difference between said simulated amplitude and said processed amplitude;

signal producing means for producing said difference digital signal as said input digital signal; and a digital-to-analog converter for converting said difference digital signal to said lower send-out signal component with said lower send-out signal component made to have an amplitude dependent on said difference.

28. A circuit as claimed in any one of claims 18, 22, and 26, further comprising means for connecting said receive-out terminal to said acoustic receiver.

29. A circuit as claimed in any one of claims 18, 22, and 26 further comprising an additional acoustic transmitter acoustically coupled to said acoustic receiver for producing a local signal resulting from acoustic coupling between said acoustic receiver and said additional acoustic transmitter; and means for supplying said receive-in terminal with said local signal as said receive-in signal.

* * * * *

UNITED STATES PATENT AND TRADEMARK OFFICE
CERTIFICATE OF CORRECTION

PATENT NO. : 4,670,903
DATED : June 2, 1987
INVENTOR(S) : T. ARASEKI et al

It is certified that error appears in the above-identified patent and that said Letters Patent is hereby corrected as shown below:

COLUMN 1, LINE 10    After "communication" insert --teleconference--;

COLUMN 1, LINE 11    After "communication" delete --teleconference--;

COLUMN 3, LINE 41    Delete "transferred" insert --transformed--;

COLUMN 4, LINE 10    Delete first occurance of "y" insert --'-- over "y";

COLUMN 6, LINE 15    After second occurance of "first" insert --high--;

COLUMN 6, LINE 22    Delete "pas" insert --pass--;

COLUMN 8, LINE 44    Delete "yL" insert --$y_L$--;

COLUMN 8, LINE 57    Delete "X'" insert --X"--;

COLUMN 11, LINE 47   Delete "'" over the "y";

COLUMN 11, LINE 66   Delete "No. B 4" insert --No. 4--;

COLUMN 14, LINE 67   Delete "ecoho" insert --echo--;

COLUMN 15, LINES 34-35   Delete "input component signal" insert --input signal component--;

UNITED STATES PATENT AND TRADEMARK OFFICE
CERTIFICATE OF CORRECTION

PATENT NO. : 4,670,903

DATED : June 2, 1987

INVENTOR(S) : T. Araseki et al

Page 2 of 2

It is certified that error appears in the above-identified patent and that said Letters Patent is hereby corrected as shown below:

COLUMN 19, LINE 44 Delete "for" insert --from--;

Signed and Sealed this

Tenth Day of May, 1988

Attest:

DONALD J. QUIGG

Attesting Officer

Commissioner of Patents and Trademarks